(12) United States Patent
Kang et al.

(10) Patent No.: US 10,999,888 B2
(45) Date of Patent: *May 4, 2021

(54) METHOD FOR RELEASING CONTEXT OF USER EQUIPMENT IN NON-3GPP ACCESS NETWORK AND NETWORK ENTITY PERFORMING THE SAME

(71) Applicant: Electronics and Telecommunications Research Institute, Daejeon (KR)

(72) Inventors: Yoo Hwa Kang, Daejeon (KR); Changki Kim, Daejeon (KR); No Ik Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,299

(22) Filed: Sep. 12, 2019

(65) Prior Publication Data

US 2020/0008263 A1 Jan. 2, 2020

Related U.S. Application Data

(63) Continuation of application No. 15/937,439, filed on Mar. 27, 2018, now Pat. No. 10,582,561.

(30) Foreign Application Priority Data

Mar. 27, 2017 (KR) .......................... 10-2017-0038680
Mar. 22, 2018 (KR) .......................... 10-2018-0033472

(51) Int. Cl.
*H04W 76/30* (2018.01)
*H04W 36/00* (2009.01)
(Continued)

(52) U.S. Cl.
CPC .......... *H04W 76/30* (2018.02); *H04W 28/08* (2013.01); *H04W 36/0033* (2013.01);
(Continued)

(58) Field of Classification Search
CPC ......... H04W 36/0016; H04W 36/0061; H04W 36/32; H04W 42/025
See application file for complete search history.

(56) References Cited

U.S. PATENT DOCUMENTS 8,416,744 B2 4/2013 Becker et al.
8,638,750 B2 1/2014 Wu et al.
(Continued)

FOREIGN PATENT DOCUMENTS

JP 5065477 B2 10/2012
KR 101044685 B1 6/2011
(Continued)

OTHER PUBLICATIONS

Hyun-Sook, Kim, Next Generation Standard Laboratory, LG Electronics, "Trends in 3GPP technology for 5G network", Dec. 2016, 16 pages, vol. 29, No. 4, OSIA S&TR Journal.
(Continued)

*Primary Examiner* — Chandrahas B Patel
(74) *Attorney, Agent, or Firm* — William Park & Associates Ltd.

(57) ABSTRACT

A method for releasing a context of a user equipment in a non-3GPP access network and a network entity performing the same are disclosed. In a case in which the UE is a unreachable state, a non-3GPP interworking function (N3IWF) may a UE context release request message to an access and mobility management function (AMF), and may perform protocol data unit (PDU) session user plane de-activation between the AMF, a session management function (SMF), and a user plane function (UPF). In addition, the
(Continued)

AMF may transmit a UE context release command message to the N3IWF, and the N3IWF may transmit a UE context release complete message to the AMF.

13 Claims, 4 Drawing Sheets

(51) Int. Cl.
*H04W 28/08* (2009.01)
*H04W 76/32* (2018.01)
*H04W 68/00* (2009.01)
*H04W 88/02* (2009.01)
*H04W 68/02* (2009.01)
*H04W 76/34* (2018.01)

(52) U.S. Cl.
CPC .......... *H04W 76/32* (2018.02); *H04W 68/005* (2013.01); *H04W 68/02* (2013.01); *H04W 76/34* (2018.02); *H04W 88/023* (2013.01)

(56) References Cited

U.S. PATENT DOCUMENTS

| | | | |
|---|---|---|---|
| 9,591,541 | B2 | 3/2017 | Zhao et al. |
| 10,652,784 | B2 * | 5/2020 | Li .................... H04W 36/0016 |
| 2014/0098791 | A1 | 4/2014 | Wu et al. |
| 2014/0308953 | A1 | 10/2014 | Park et al. |
| 2017/0202051 | A1 | 7/2017 | Hwang |

FOREIGN PATENT DOCUMENTS

| | | |
|---|---|---|
| KR | 1020130090831 A | 8/2013 |
| KR | 1020150083406 A | 7/2015 |
| WO | 2017099464 A1 | 6/2017 |

OTHER PUBLICATIONS

SA WG2 Meeting #120, "TS 23.502: P-CR to add N2 Release procedure for Non-3GPP", Mar. 27-31, 2017, pp. 1-2, S2-172173, ETRI, Busan, Korea.

"23.502 §4.2.X: adding procedures for N2 release", SA WG2 Meeting #120, S2-171727, Mar. 21-27, 2017, pp. 1-3, Nokia, Alcatel-Lucent Shanghai Bell, Qualcomm Inc, Busan, South Korea.

"23.502: Mobility management model for non-3GPP accesses: procedures", SA WG2 Meeting #S2-119, S2-170739, Feb. 13-17, 2017, pp. 1-12, Qualcomm Incorporated, Dubrovnik, Croatia.

"TS 23.502: N2 release for untrusted non-3GPP access", SA WG2 Meeting #120, S2-171728, Mar. 27-31, 2017, pp. 1-2, Nokia, Alcatel-Lucent Shanghai Bell, Qualcomm Incorporated, Busan, South Korea.

* cited by examiner

METHOD FOR RELEASING CONTEXT OF USER EQUIPMENT IN NON-3GPP ACCESS NETWORK AND NETWORK ENTITY PERFORMING THE SAME

CROSS-REFERENCE TO RELATED APPLICATION

This application is a continuation application of U.S. patent application Ser. No. 15/937,439, filed on Mar. 27, 2018, and claims priority to and the benefit of Korean Patent Application No. 10-2017-0038680 and 10-2018-0033472 filed in the Korean Intellectual Property Office on Mar. 27, 2017, and Mar. 22, 2018, respectively, the entire contents of which are incorporated herein by reference.

BACKGROUND OF THE INVENTION

(a) Field of the Invention

The present invention relates to a method for releasing a context of a user equipment in a non-3GPP access network and a network entity performing the same.

(b) Description of the Related Art

In conventional 3GPP (3$^{rd}$ Generation Partnership Project) LTE (Long Term Evolution), an S1 release may be triggered by a base station and a mobility management entity (MME). The S1 release is triggered by the base station in the case of user inactivity, repeated RRC signaling integrity check failure, release due to UE generated signaling connection release, unspecified failure, operation and maintenance (O&M) intervention, and the like. The S1 release is triggered by the MME in the case of authentication failure, detach, and the like.

When the S1 release is performed, a data radio bearer and a downstream S1 bearer are released in a user plane. In addition, in a control plane, a radio resource control connection and an S1 signaling connection are released, and only an upstream S1 bearer resource is maintained in a network. Therefore, all of the resources of an access network allocated by the base station are released, only the resource allocated by an evolved packet core (EPC) is maintained, and a user equipment is transitioned to an ECM (EPS (Evolved Packet System) Connection Management) connection)-idle state in which an access is established, but an ECM connection is not established.

3GPP 5G, which is recently standardized, requires a procedure similar to the S1 release. Meanwhile, 3GPP 5G integrally includes a 3GPP access network and a non-3GPP access network. The non-3GPP network requires a method for releasing a context of a user equipment.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for releasing a context of a user equipment in a non-3GPP access network.

The present invention has been made in an effort to provide a reachability management method capable of returning to a state before a context of a user equipment is released.

An exemplary embodiment of the present invention provides a method for releasing a context of a user equipment (UE) in a non-3GPP access network. The method may include transmitting, by a non-3GPP interworking function (N3IWF), a UE context release request message to an access and mobility management function (AMF), when the UE is in a unreachable state, performing protocol data unit (PDU) session user plane de-activation between the AMF, a session management function (SMF), and a user plane function (UPF), transmitting, by the AMF, a UE context release command message to the N3IWF, and transmitting, the N3IWF, a UE context release complete message to the AMF.

The UE may be already registered with a core network before the UE is in the unreachable state.

The performing of the PDU session user plane de-activationin may include transmitting, by the AMF, a N2 connection release request message to the SMF, transmitting, by the SMF, a N4 session modification request message to the UPF, transmitting, by the UPF, a N4 session modification response message to the SMF, and transmitting, by the SMF, a N2 connection release response message to the AMF.

The SMF may release information related to the N3IWF when receiving the N2 connection release request message.

The N4 session modification request message may include PDU session identity (ID).

The method may further include exchanging, the N3IWF, an internet key exchange (IKE) information exchange message with the UE.

An IKA security association (SA) may be released through the exchanging of the IKE information exchange message.

The method may further include transmitting, by the AMF, a paging message to the UE through a 3GPP access, when the UE is in connection management (CM)-IDLE in the 3GPP access and a non-3GPP access and downlink data related to the non-3GPP access exists.

The downlink data related to the non-3GPP access may be set in an access type of the paging message.

The UE may be in a registered state through the 3GPP access and the non-3GPP access.

Another embodiment of the present invention provides a method for releasing a context of a user equipment (UE) by a non-3GPP interworking function (N3IWF) connected to a non-3GPP access. The method may include determining whether or not the UE is in a unreachable state, transmitting a UE context release request message to an access and mobility management function (AMF) when the UE is in the unreachable state, receiving a UE context release command message from the AMF, and transmitting a UE context release complete message to the AMF.

The determining of whether or not the UE is in the unreachable state may include determining whether or not the UE is in the unreachable state by performing an internet key exchange (IKE) dead pear detection (DPD) for the UE.

The AMF may perform protocol data unit (PDU) session user plane de-activation with a session management function (SMF) and a user plane function (UPF) when receiving the UE context release request message.

The method may further include transmitting an internet key exchange (IKE) information exchange message to the UE, and receiving the (IKE information exchange message from the UE.

Yet another embodiment of the present invention provides a first network entity processing a control signal on a network. The first network entity may include a network interface receiving a user equipment (UE) context release request message from a second network entity connected between a non-3GPP access and the first network entity, and a processor performing a control so that protocol data unit (PDU) session user plane de-activation is performed with a third network entity, which is a network entity of a data plane and performing a control so that a UE context release command is transmitted to the second network entity when receiving the UE context release request.

The network interface may receive a UE context release complete from the first network entity.

The processor may transmit a paging message to the UE through a 3GPP access, when the UE is in connection management (CM)-IDLE in the 3GPP access and a non-3GPP access and downlink data related to the non-3GPP access exists.

The downlink data related to the non-3GPP access may be set in an access type of the paging message.

The UE may be in a registered state through the 3GPP access and the non-3GPP access.

The first network entity may be an access and mobility management function (AMF), the second network entity may be a non-3GPP interworking function (N3IWF), and the third network entity may be a user plane function (UPF).

According to an exemplary embodiment of the present invention, the context of the user equipment may be released in the non-3GPP access network.

According to another exemplary embodiment of the present invention, the reachability management of the user equipment may be performed by paging to the 3GPP access.

DETAILED DESCRIPTION OF THE EMBODIMENTS

Figure 1:
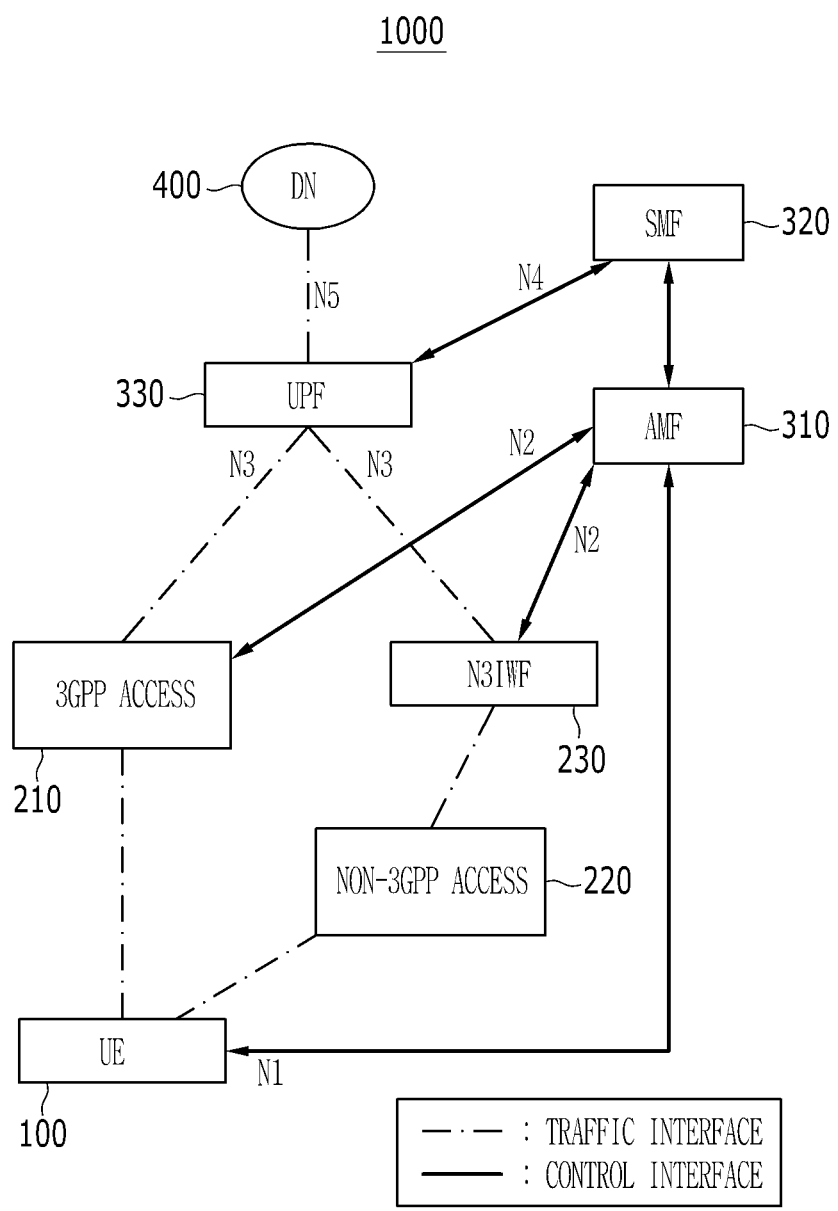
FIG. 1 is a drawing illustrating a 5G network system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, a user equipment (UE) may be referred to as a mobile terminal (MT), a mobile station (MS), an advanced mobile station (AMS), a high reliability mobile station (HR-MS), a subscriber station (SS), a portable subscriber station (PSS), an access terminal (AT), or the like, and may also include functions of all or some of the terminal, the MT, the AMS, the HR-MS, the SS, the PSS, the AT, the UE, or the like.

In addition, a base station (BS) may be referred to as an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as the base station, a high reliability relay station (HR-RS) serving as the base station, or the like, and may also include functions of all or some of the BS, the ABS, the nodeB, the eNodeB, the AP, the RAS, the BTS, the MMR-BS, the RS, the HR-RS, or the like.

Hereinafter, for convenience of explanation, in a 5G network system environment including two access network (AN) types such as 3GPP and Non-3GPP, a method for releasing a context of a user equipment in a non-3GPP access network will be described, but may also be applied to other examples.

FIG. 1 is a drawing illustrating a 5G network system according to an exemplary embodiment of the present invention.

As illustrated in FIG. 1, a 5G network system 1000 according an exemplary embodiment of the present invention includes a user equipment (UE) 100, a 3GPP access 210, a non-3GPP access 220, a non-3GPP interworking function (N3IWF) 230, an access and mobility management function (AMF) 310, a session management function (SMF) 320, a user plane function (UPF) 330, and a data network (DN) 400.

The user equipment 100 may access to a cellular mobile radio access network via the 3GPP access 210. In addition, the user equipment 100 may access to a radio RAN access network via the non-3GPP access 220 and the N3IWF 230. Here, the N3IWF 230 and the non-3GPP access 200 may be integrated with each other.

The AMF 310 and the SMF 320 are network entities processing a control signal. The AMF 310 performs authentication, connection and mobility control functions. The SMF 320 has a session control function (setting/change/release of a session) and performs a signaling procedure for a traffic path setting and a traffic mobility management. That is, the SMF 320 controls data paths between the UPF 330 and the RANs 210, 220, and 230. The AMF 310 has N1, which is a non-access stratum (NAS) signal interface, together with the user equipment 100.

The UPF 330 is a network entity of a data plane that integrally accommodates multiple RANs via an N3 interface. The UPF 330 connects data planes between multiple access networks (the 3GPP access, the non-3GPP access, the N3IWF of FIG. 1) and the DN 400, and a traffic of the user equipment 100 (i.e., a user) may be transmitted and received via the connected data planes.

The UPF 330 and the respective RANs 210 and 230 receive a routing rule for the user equipment 100 from the SMF 320 via N4 and N2 interfaces, and perform an IP routing function through the received routing rule.

As such, the 5G network system according to an exemplary embodiment of the present invention has an integrated structure that simultaneously accommodates the 3GPP access 210 and the non-3GPP access 220. In the integrated structure as described above, a method for releasing a context of a user terminal in a non-3GPP access network (i.e., an N2 Release method) is required, which will be hereinafter described in detail with reference to FIG. 2.

Figure 2:
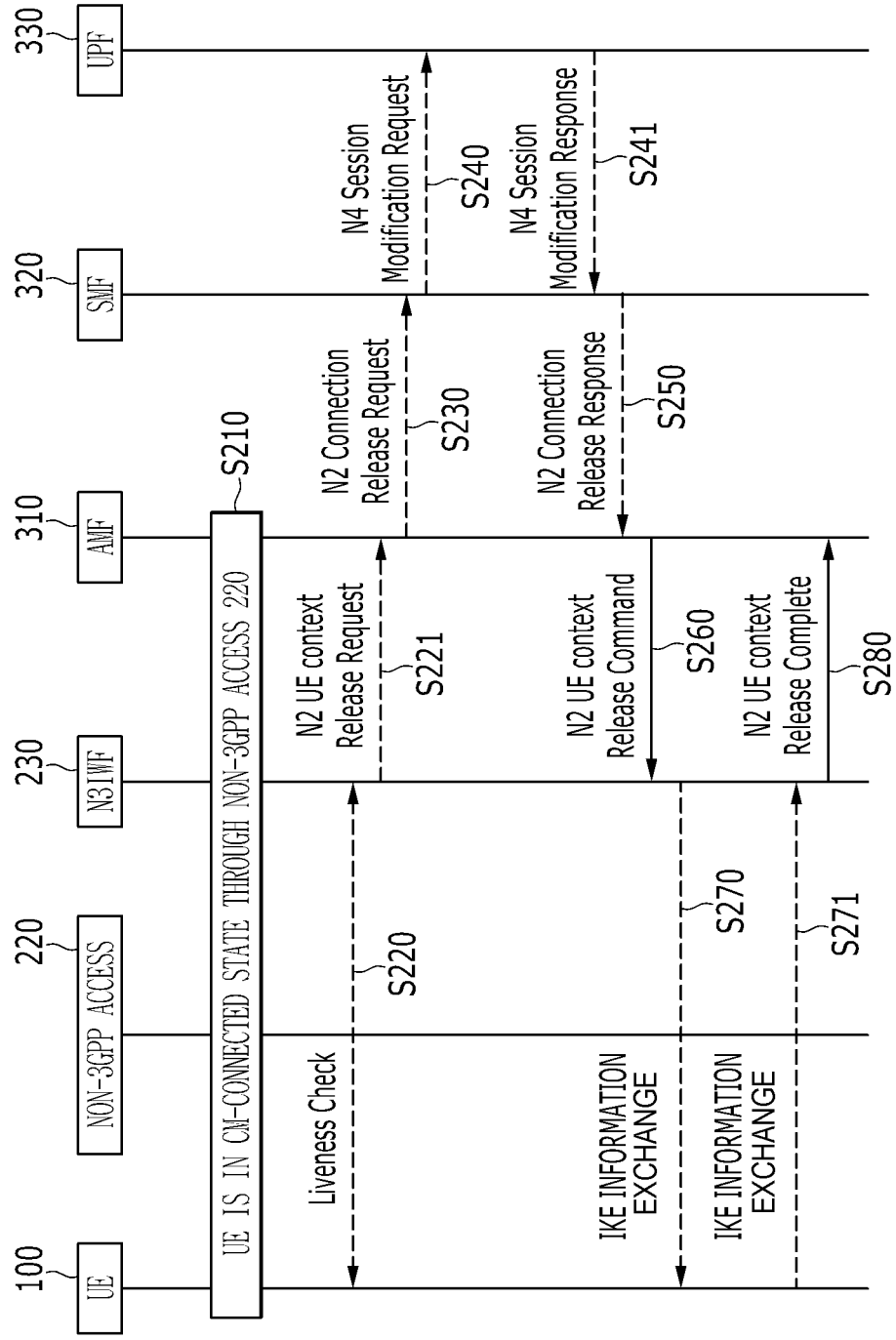
FIG. 2 is a flowchart illustrating a method for releasing a context of a user equipment in a non-3GPP access network according to an exemplary embodiment of the present invention.

FIG. 2 is a flowchart illustrating a method for releasing a context of a user equipment in a non-3GPP access network according to an exemplary embodiment of the present invention.

The context of the user equipment (UE Context) indicates UE related information, UE registration information, session ID, QoS, a UE address, a RAN address, and the like. The release of the context of the user equipment is to release such UE related information in the network.

First, the user equipment 100 becomes a connection management (CM)-connected state by connecting through the non-3GPP access, and is a state in which one or more protocol data unit (PDU) sessions are generated (S210). That is, it is assumed that the user equipment 100 is already registered with a 5G core network.

In the S210 state, a procedure of releasing the context of the user equipment may be triggered by the AMF 310 or the N3IWF 230. The causes of the procedure of releasing the context of the user equipment include a case of a UE unreachable state due to a radio connection release between the user equipment 100 and the N3IWF 230, and a case of a user inactivity state in which no data is transmitted. In addition, the N3IWF 230 may request the release of the context of the user equipment for purpose of management, and the AMF 310 may request the release of the context of the user equipment for purpose of management.

The N3IWF 230 performs a liveness check for the user equipment 100 (S220). The N3IWF 230 may perform the liveness check for the user equipment by performing an internet key exchange (IKE) dead peer detection (DPD) function. That is, the N3IWF 230 detects whether or not the user equipment 100 is a unreachable state.

If the N3IWF 230 determines that the user equipment 100 is in the unreachable state through the liveness check for the user equipment 100, the N3IWF 230 may trigger a procedure of releasing the context of the user equipment. That is, the N3IWF 230 may trigger the procedure of releasing the context of the user equipment by transmitting a N2 UE context release request message to the AMF 310 (S221).

If the AMF 310 receives the N2 UE context release request message in the operation (S221), the AMF 310 transmits a N2 connection release request message to the SMF 320 (S230). That is, the AMF 310 transmits the N2 connection release request message to the SMF 320 to thereby request a release of all N3 connections. Here, the N3 connection indicates a connection between the N3IWF 230 and the UPF 330. Meanwhile, when the AMF 310 triggers the procedure of releasing the context of the user equipment, the operations (S220 and S221) are omitted, and the AMF 310 may immediately transmit the N2 connection release request message to the SMF 320. The N2 connection release request message may be a Nsmf_PDUSession_UpdateSMContext(N Session Management Function_PDU Session_Update Session Management Context) message.

If the SMF 320 receives the N2 UE context release request message in the operation (S230), the SMF 320 releases information related to the N3IWF 230. In addition, in order to release to the information related to the N3IWF 230, the SMF 320 transmits a N4 session modification request message to the UPF 330 (S240). Here, the N4 session modification request message includes PDU session identity (ID).

If the UDF 330 receives the N4 session modification request message in the operation (S240), the UPF 330 releases (conceals) the information related to the N3IWF 230. In addition, the UPF 330 transmits the N4 session modification response message to the SMF 320 (S241).

If the SMF 320 receives the N4 session modification response message in the operation (S241), the SMF 320 transmits the N2 connection release response message to the AMF 310 (S250). The N3 connection release response message may be a Nsmf_PDUSession_UpdateSMContext Ack message.

The operations (S230, S240, S241, and S250) described above may be collectively referred to as a PDU session user plane de-activation operation.

In addition, if the AMF 310 receives the N2 connection release response message in the operation (S250), the AMF 310 transmits a N2 UE context release command to the N3IWF 230 and performs the context release of the user equipment (i.e., a N2 connection release) (S260).

Meanwhile, the N3IWF 230 may transmit an internet key exchange (IKE) information exchange message to the user equipment 100. That is, in order to release IKE security association (SA) and child IPSec SA which may exist, the N3IWF 230 transmits the IKE information exchange message to the user equipment.

If the IKE SA and the child IPSec SA exist, the user equipment 100 release the IKE SA and the child IPSec SA and then transmits the IKE information exchange message to the N3IWF 230 (S271).

Finally, the N3IWF 230 transmits a N2 UE context release complete message to the AMF 310 to inform that the procedure of releasing the context of the user equipment is completed (S280).

By the procedure as described above, a connection for the user equipment 100 between the AMF 310 and the N3IWF 230 is released.

Meanwhile, if the user equipment 100 is in a connection management (CM)-IDLE state in the non-3GPP access 220, UE reachability may not be secured. That is, in a case in which a downlink traffic occurs from a network side, a unreachable UE may occur due to a connection release of the non-3GPP access network. Accordingly, after the context release of the user equipment (N2 release), reachability for the user equipment 100 which is in the CM-IDLE state is required. Hereinafter, reachability management in the non-3GPP access network will be described with reference to FIG. 3.

Figure 3:
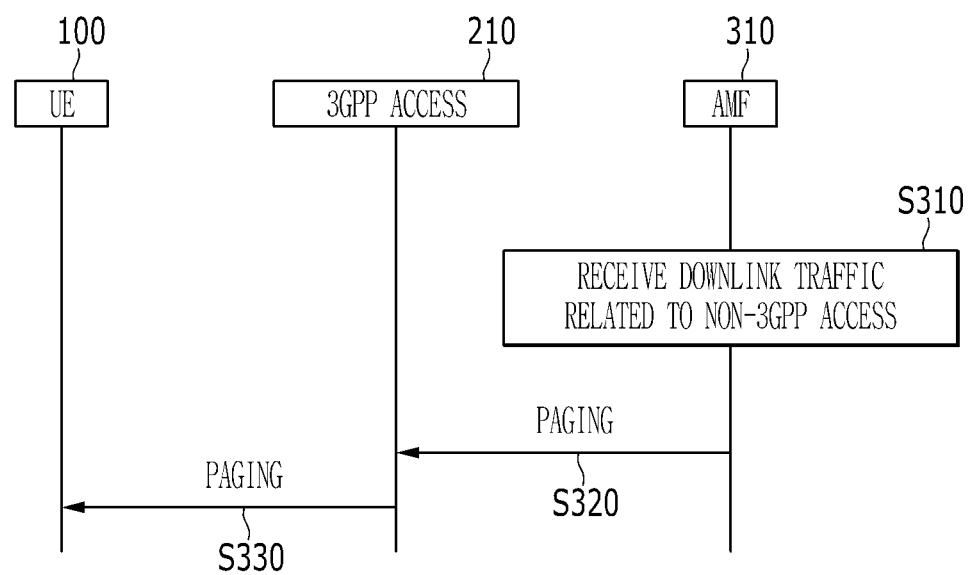
FIG. 3 is a flowchart illustrating a reachability management method of a non-3GPP access network according to an exemplary embodiment of the present invention.

FIG. 3 is a flowchart illustrating a reachability management method of a non-3GPP access network according to an exemplary embodiment of the present invention.

The reachability management method of the non-3GPP access network according to an exemplary embodiment of the present invention may be applied when the following conditions are satisfied. The conditions are the cases in which the user equipment 100 is registered through the 3GPP access 210 and the non-3GPP access 220, and is in the CM-IDLE state in the 3GPP access 210 and the non-3GPP access 220. In addition, the condition is a case in which PDU session ID for a downlink track is associated with the non-3GPP access 220.

First, the AMF 310 receives notification for the downlink traffic related to the non-3GPP access from the network side (e.g., the SMF 320) (S310).

If the AMF 310 receives the notification for the downlink traffic related to the non-3GPP access in the operation (S310), the AMF 310 transmits a paging message to the 3GPP access 210 (S320). The downlink traffic related to the non-3GPP access is set in an access type of the paging message.

If the 3GPP access 210 receives the paging message in the operation (S320), the 3GPP access 210 transmits the paging message to the UE 100 (S330). The UE 100 may know that the downlink traffic related to the non-3GPP access exists by receiving the paging message from the 3GPP access 210.

By the procedures as described above, reachability may also be secured for the UE, which is in the CM-IDLE state.

Figure 4:
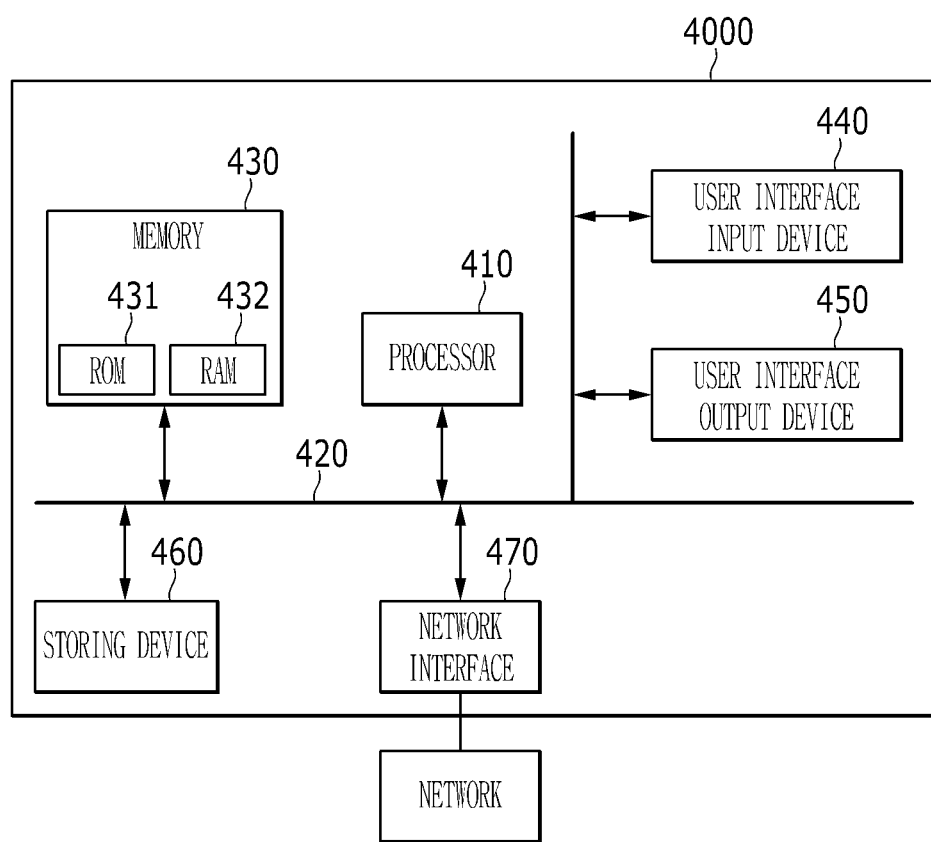
FIG. 4 is a diagram illustrating a network entity according to an exemplary embodiment of the present invention.

FIG. 4 is a diagram illustrating a network entity according to an exemplary embodiment of the present invention.

The network entity in FIG. 4 may be the N3IWF 230, the AMF 310, the SMF 320, or the UPF 330 of FIG. 1. Such a network entity may be implemented as a computer system, for example, a computer readable medium.

A computer system 4000 may include at least one of a processor 410, a memory 430, a user interface input device 440, a user interface output device 450, and a storing device 460 which communicate with each other through a bus 420. The computer system 4000 may further include a network interface 470 coupled to a network. The network interface 470 may transmit or receive a signal to or from other entities.

The processor 410 may be a central processing unit (CPU), or a semiconductor device executing instructions stored in the memory 430 or the storing device 460. The processor 410 may be configured to implement the method and the functions described above with reference to FIGS. 1 to 3.

The memory 430 and the storing device 460 may include various forms of volatile or non-volatile storing mediums. For example, the memory 1300 may include a read only memory (ROM) 431 and a random access memory (RAM) 432. According to the exemplary embodiment of the present invention, the memory 430 may be internal or external of the processor 410, and may be connected to the processor 410 by various means which are already known.

Therefore, the exemplary embodiment of the present invention may be implemented as a computer implemented method, or a computer readable medium having a computer executable instruction stored therein. According to an exemplary embodiment of the present invention, when being executed by the processor, the computer executable instruction may perform the method according to at least one aspect of the present disclosure.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for releasing a context of a user equipment (UE) in a non-3GPP access network, the method comprising:
   sending, by a non-3GPP interworking function (N3IWF), a UE context release request message to an access and mobility management function (AMF), when the UE is not reachable,
   sending, by the AMF, a UE context release command message to the N3IWF,
   exchanging, the N3IWF, an internet key exchange (IKE) information exchange message with the UE,
   sending, the N3IWF, a UE context release complete message to the AMF, and
   performing protocol data unit (PDU) session user plane de-activation between the AMF, a session management function (SMF), and a user plane function (UPF).

2. The method of claim 1, wherein:
   the UE is already registered with a core network before the UE is not reachable.

3. The method of claim 1, wherein:
   an IKE security association (SA) is released through the exchanging of the IKE information exchange message.

4. The method of claim 1, further comprising:
   sending, by the AMF, a paging message to the UE through a 3GPP access, when the UE is in connection management (CM)-IDLE in the 3GPP access and a non-3GPP access and downlink data related to the non-3GPP access exists.

5. The method of claim 4, wherein:
   the downlink data related to the non-3GPP access is set in an access type of the paging message.

6. The method of claim 4, wherein:
   the UE is in a registered state through the 3GPP access and the non-3GPP access.

7. A method for releasing a context of a user equipment (UE) by a non-3GPP interworking function (N3IWF) communicating with a non-3GPP access, the method comprising:
   detecting that the UE is not reachable,
   sending a UE context release request message to an access and mobility management function (AMF),
   receiving a UE context release command message from the AMF,
   exchanging an internet key exchange (IKE) information exchange message with the UE, and
   sending a UE context release complete message to the AMF.

8. The method of claim 7, wherein:
   the AMF performs protocol data unit (PDU) session user plane de-activation with a session management function (SMF) and a user plane function (UPF).

9. The method of claim 7, wherein:
   the exchanging the IKE exchange message with the UE includes a performing a release of IP security (IPsec) tunnel.

10. A first network entity communicating with a non-3GPP access, the first network entity comprising:
    a processor configured to control detecting that an user equipment (UE) is not reachable, sending a UE context release request message to a second network entity, receiving a UE context release command message from the second network entity, exchanging an internet key exchange (IKE) information exchange message with the UE, and sending a UE context release complete message to the second network entity, and
    a network interface configured to communicate with the UE and the network entity.

11. The first network entity of claim 10, wherein:
    a release of IP security (IPsec) tunnel is performed by the exchanging the IKE information exchange message.

12. The first network entity of claim 10, wherein:
    an IKE security association (SA) and any child IP security (child IPsec) SA is released by the exchanging the IKE information exchange message.

13. The first network entity of claim 10, wherein:
    the first network is a non-3GPP interworking function (N3IWF) and the second network is an access and mobility management function (AMF).

* * * * *